United States Patent Office 3,564,055
Patented Feb. 16, 1971

3,564,055
ETHERS CONTAINING DIFLUORAMINO GROUPS
Abraham Zimmerman, New York, N.Y., assignor to Esso Research and Engineering Company, a corporation of Delaware
No Drawing. Filed Oct. 16, 1963, Ser. No. 317,108
Int. Cl. C07c 93/02
U.S. Cl. 260—584    2 Claims This invention relates to a new solid oxidizer useful in solid rocket propellants. This solid oxidizer contains a nitro group in addition to more than one difluoramino group per carbon atom and is called tris[tris(difluoramino)methoxymethyl]-nitromethane. This compound has been isolated and identified as having the following structural composition:

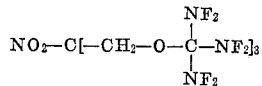

In formulations of solid rocket propellants the high-energy ingredients sought are binders, plasticizers, and oxidizers which form fuel and oxidizing constituents. Such ingredients contain hydrogen and carbon as fuel ingredients and are generally to be mixed with metal containing fuel ingredients. The binders and plasticizers should also have a high proportion of fluorine and oxygen oxidizing groups if possible to supplement inorganic oxygen oxidizers in order to attain high specific impulse values of the order of 300 or higher. In addition to the energy value of an oxidizer there are a number of other characteristics which have to be evaluated to determine if it is a suitable improvement, e.g., such characteristics as volatility, thermal stability, and compatability. The compound should also be attainable in good yields without difficulties in its manufacture and should be capable of being purified. According to the present invention, the solid oxidizer tris[tris(NF$_2$)methoxymethyl]-nitromethane has been successfully produced in satisfactory yields, purified, and found to be useful in its evaluated characteristics. It is a superlatively high energy solid oxidizer. It is made satisfactorily by reacting tris(hydroxymethyl)nitromethane with perfluoroguanidine in a diluent such as acetonitrile and with urea as a catalyst.

The following example and data illustrate a satisfactory method for its production, purification, and test results on its properties.

EXAMPLE

Tris(hydroxymethyl)nitromethane (1.0 g.) and urea (0.1 g.) were placed in 15 ml. of acetonitrile and reacted with 6 g. of perfluoroguanidine, which has the formula (F$_2$N)$_2$C=NF. The reaction mixture was stirred for three days at about room temperature. The crude product obtained by the addition reaction of the tris(hydroxymethyl)nitromethane with the perfluoroguanidine was fluorinated with fluorine for one hour at 0° C. using a 10% mixture of fluorine with nitrogen. After stripping the solvent from the fluorinated reaction mixture, the residue was purified by column chromatography on silica gel in two stages:

First, an initial chromatography with CHCl$_3$ elution, giving a product in 40% yield as a low-melting soft solid.

Second, a rechromatography eluting with 10 to 50% CHCl$_3$/pentane solution gave a higher melting product and on recrystallization in pentane the solid product was found to have a melting point of 65.5° to 66° C.

Chemical analysis of the product found (percent): Found—C, 13.75; N, 22.29; F, 51.7. Theory: C, 12.88; N, 21.47; F, 52.4.

The chemical analysis, nuclear magnetic resonance and infrared analysis showed that this solid product has the assigned structure and composition:

This compound, given the appellation tris[tris(NF$_2$)methoxymethyl]-nitromethane, may also be termed 1,3-bis[tris(NF$_2$)methoxy]-2-nitro - 2 - tris(NF$_2$)methoxymethyl propane. Other physical characteristics of the solid product are as follows:

Vapor pressure: Very low <0.05 mm.@ 25° C.
Differential thermal analysis: Sharp exotherm at 225° C.—slow decomposition from 195° C.
Shock sensitivity: 2 kg. in.
Elemental analysis (percent): Calc'd: C, 12.88; N, 21.32; F, 52.5. Found: C, 14.66; N, 21.53; F, 51.3.

This compound showed surprisingly high thermal stability as indicated by the differential thermal analysis. This test showed that the compound did not decompose at a substantial rate below 225° C.

The solid tris[tris(NF$_2$)methoxymethyl]-nitromethane was found to have excellent utility in a mixture of polytetrakis(NF$_2$)amyl acrylate, which is one of the best energetic polymer binders. The solid oxidizer tris[tris(NF$_2$)methoxymethyl]-nitromethane may be used as a thickener for liquid oxidizers which may contain the difluoramino groups or both difluoramino and nitro groups. It has been evaluated as an ingredient of rocket propellants which are to be made to contain limited amounts of nitronium perchlorate or hydrazinium diperchlorate as solid inorganic oxidizers with either boron or lithium metal fuel ingredients. In formulations of polytetrakis(NF$_2$)amyl acrylate binder in proportions of 0 to 50 wt. percent of the composite, with hexakis(NF$_2$)propyl ether as liquid plasticizer, the solid oxidizer O$_2$NC[CH$_2$OC(NF$_2$)$_3$]$_3$ has been found capable of giving composite Isp ratings in the range of 293 to 306.

Formulation tests were made of the solid oxidizer O$_2$NC[CH$_2$OC(NF$_2$)$_3$]$_3$ added to tetrakis(NF$_2$)amyl acrylate (TAA) before polymerization and mixed with preformed poly TAA to determine if the oxidizer is compatible in the resulting binders and whether the binders have satisfactory properties. Results of the formulation tests are set forth in the following table:

TABLE I
[Formulations of O$_2$NC[CH$_2$OC(NF$_2$)$_3$]$_3$ with TAA]

| | Polymerization in situ | | Performed Polymer, No. 3 |
|---|---|---|---|
| | No. 1 | No. 2 | |
| Component, wt. percent: | | | |
| O$_2$NC[CH$_2$OC(NF$_2$)$_3$]$_3$ | [1] 49.2 | [2] 49.2 | [1] 48.5 |
| TAA | 33.3 | 33.0 | |
| Poly TAA | [3] 14.3 | [3] 14.2 | [4] 51.5 |
| TMP-TMA | 2.1 | 2.16 | |
| Initiator [5] | 1.1 | 1.4 | |
| Cure: | | | |
| Temperature, °C | 50 | 50 | 65 |
| Time, hrs | 144 | 168 | 72 |
| Tensile, p.s.i. average | 97 | 75 | 219 |
| Elongation, percent, average | 92 | 10 | 131 |
| Shock, kg. in | 9 | 7 | 5 |

[1] Crude product of 35° C. melting point.
[2] Purified product of 65° C. melting point.
[3] Poly TAA crosslinked with trimethacrylate (TMA) of trimethylolpropane (TMP).
[4] Poly TAA of about 530,000 molecular weight.
[5] Dichlorobenzoyl peroxide, initiator.

Although average and reproducible data are given on the tensile and elongation of the formulated binders, some of these were higher, e.g., as high as 263 p.s.i. tensile strength for the No. 3 formulation, as when the mixing was for a longer period of 4 hours followed by cooling. The solid products obtained had a waxy yellow and cloudy yellow appearance. Their tensile properties as shown, are decidedly superior to binders of polytetrakis(NF$_2$)amyl acrylate made with hexakis(NF$_2$)propyl ether as a plasticizer.

The invention described is claimed as follows:
1. The compound tris[tris(NF$_2$)methoxymethyl]-nitromethane having the composition:

2. The method of making tris[tris(NF$_2$)methoxymethyl]-nitromethane which comprises reacting tris(hydroxymethyl)-nitromethane with perfluoroguanidine in acetonitrile with urea as catalyst, fluorinating the resulting crude product with fluorine, and recovering a solid crystalline product having the composition:

$$O_2NC[CH_2OC(NF_2)_3]_3$$

References Cited

Hoffman et al.: Chem. Reviews, vol. 62, pp. 12 to 18 (1962).

LELAND A. SEBASTIAN, Primary Examiner

U.S. Cl. X.R.

149—19, 88